United States Patent [19]

Ackeret

[11] 3,926,310

[45] Dec. 16, 1975

[54] CONTAINER FOR 8-TRACK TAPE CARTRIDGES

[75] Inventor: Peter Ackeret, Kusnacht, Switzerland

[73] Assignee: IISI Products AG, Chur, Switzerland

[22] Filed: Sept. 19, 1974

[21] Appl. No.: 507,336

[30] Foreign Application Priority Data

June 5, 1974 Germany ............................ 2427108

[52] U.S. Cl. ................................. 206/387; 312/219

[51] Int. Cl.[2] .................. B65D 85/672; E05B 65/46

[58] Field of Search ........ 206/387; 312/111, 10, 15, 312/19, 219, 71

[56] References Cited

UNITED STATES PATENTS

| | | | |
|---|---|---|---|
| 3,552,817 | 1/1971 | Marcolongo | 312/111 |
| 3,561,004 | 2/1971 | Kouz et al. | 312/10 |
| 3,582,168 | 6/1971 | Bian et al. | 312/19 |
| 3,866,990 | 2/1975 | McRae | 312/15 |

FOREIGN PATENTS OR APPLICATIONS

| | | | |
|---|---|---|---|
| 2,248,408 | 1/1974 | Germany | 206/387 |

*Primary Examiner*—William T. Dixson, Jr.
*Attorney, Agent, or Firm*—H. Dale Palmatier; James R. Haller

[57] ABSTRACT

A container for 8-track tape cartridges having a number of stacked and stackable housings, each with a spring operated cartridge ejector, a latch to hold the ejector against the spring action, the ejector being movable in a fore and aft direction to accept and eject the cartridge and also movable transversely of said direction in guides on the housing to be alternately locked and released and to release the cartridge from the ejected position, the ejector having a cartridge ejecting lip, and a projection mating with a recess in the cartridge to brake and retain the cartridge during ejecting movement.

18 Claims, 14 Drawing Figures

CONTAINER FOR 8-TRACK TAPE CARTRIDGES

SUMMARY OF THE INVENTION

The invention relates to a container for the storage of magnetic tape casettes, especially in cartridge form, in the shape of a rectangular housing which is open on one of its narrow sides for the insertion and removal of the cassettes, wherein the cassette pre-tensions an ejector member against a spring force when it is inserted, and the ejector member is locked in the insertion position, but after the locking means has been released the cassette is automatically conveyed out into a convenient removal position by the ejector member.

Containers of this type are already marketed. The known containers are so constructed that the cassette which is to be stored is placed in a sliding transport slider which when pushed into the container together with the inserted cassette pre-tensions an ejector spring, by means of which the transport slider is conveyed out into a convenient position for the removal of the cassette when a locking means is released. Several such containers may be interlocked to form stacking blocks.

The container according to the invention is principally intended for the larger cassettes marketed, the so-called 8-track cassettes or cartridges, which have on one side edge a notch-like excision. However, the invention may similarly be used also for cassettes which have some kind of depressions or holes at other points, or notches just off-center at this point.

The aim of the invention is to create a container, especially for cartridges, in which, while retaining the advantages — stackability, manufacture from plastic by the injection-moulding method — a drawer-like transport slider which takes a great deal of material is omitted, and is replaced by an ejector mechanism which costs less in materials and from the point of view of injection-moulding technique, and also automatically conveys cartridges out into a convenient removal position when a locking means is released, in order, for example, to be able to remove any required cartridge unhindered and easily from a block of stacked containers.

This aim is fulfilled according to the invention by the fact that the ejector member is a lever which is movable in the ejection direction and can be rotated, pivoted or tilted in a second plane, transversely of said ejection direction and which engages under the cassette with one arm or thruster and with the other arm is guided in a channel or ejector space running parallel to a side edge of the cassette; that the other arm has a cam or mating insert projecting into the insertion path of the cassette which is complementary in shape to an angular excision in the cassette housing; that the cam only drops into the excision when the correct side of the cassette is pushed in, is held firmly by the lever which can only then be locked in the housing, and that after the locking means is released the cam can be pivoted, tilted or rotated out of the excision by the removal of the caassette against a spring force.

With this construction the housing can fit closely on the cassette since the channel which accommodates the ejector and locking members can be very narrow. It is of particular advantage that the ejector lever — the nucleus of the subject of the invention — simultaneously carries out the following functions:

First: due to its engagement in the excision the cam holds the cassette firmly in the housing for as long as it is stored.

Second: it transports the cassette into the removal position, with the spring force coming fully into effect (unbraked), since the cam still moves with it in the excision.

Third: the lever brakes the cassette when the removal position is reached — but not until this position is reached — due to the fact that for the further movement of the cassette the cam must be pushed out of the excision and then under spring force rests with a braking action against the narrow side of the cassette; in this way the cassette itself cannot then fall out if the container is arranged with its open side inclined slightly downwards.

Finally, fourth: the lever ensures that the cassette is always stored in the correct position in the container (i.e., ready for use), since it is only then that the retaining effect is produced.

The lever is preferably actuated from the open side of the housing, where the channel also opens toward the outside. When the lever projects so far forward it projects outward in the removal position. It is therefore preferable to associate an unlocking key with the lever in such a way that the lever and the key can slide past one another in a telescopic manner during the ejection movement.

Further preferred features of the invention are apparent from the subsidiary claims.

Sample embodiments for the container according to the invention are explained in greater detail hereinafter with reference to the accompanying drawings; all sample embodiments are intended for cassettes of the cartridge type.

DETAILED DESCRIPTION OF THE INVENTION

Figure 1:
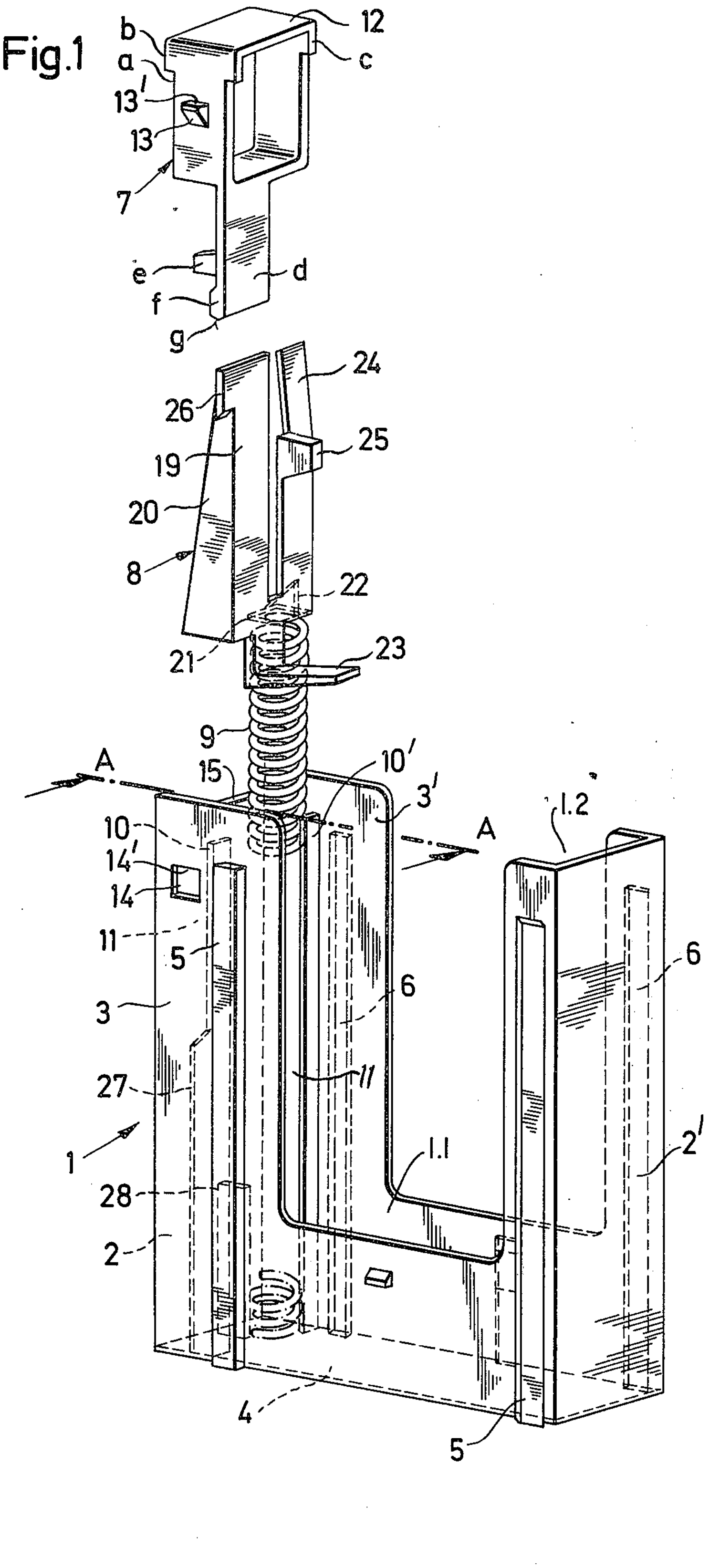
FIG. 1 shows a diagrammatic exploded view of a container according to the invention.
Figure 4:
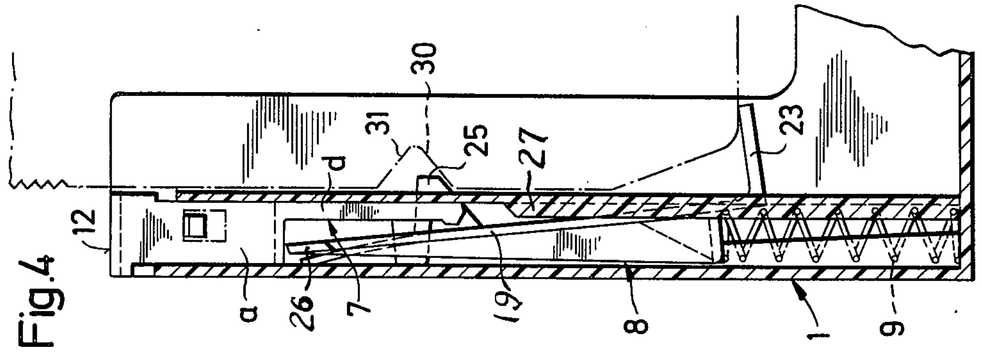
FIGS. 2 – 4 show longitudinal sections through the container in FIG. 1 along the line A—A; they show the position of the individual components in the storage position, an intermediate position, and in the removal position for the cassette.
Figure 3:
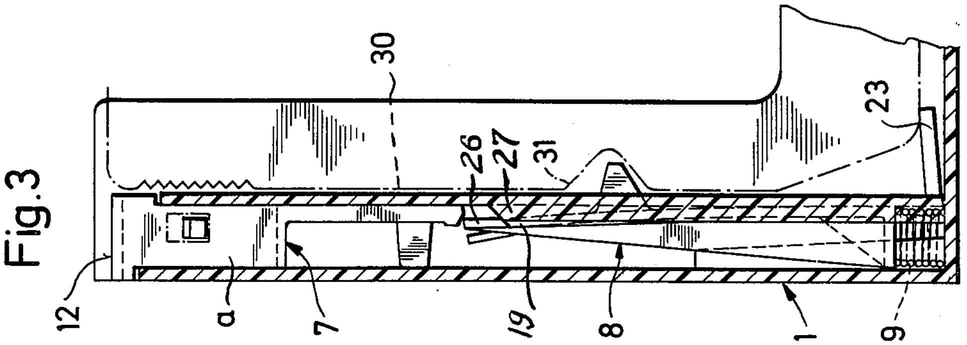

The preferred embodiment according to FIGS. 1–5 will first be described.

The reference 1 indicates the storage container which consists of a U-shaped frame housing defining a storage compartment 1.1 with the top side 1.2 open. The housing has side walls 2, 2', covering walls 3, 3' and a base 4. On the outside the covering walls 3, 3' have projecting strips 5 and complementary grooves 6 in order that the containers can be stacked or joined together to form blocks.

The reference 7 indicates a key which serves as locking member and is to be moved by finger pressure in order to unlock it, 8 indicates the lever acting as ejector, and 9 a helical spring, and during assembly these parts are fitted in reverse order into a channel or ejector space which is rectangular in cross section and divided off by means of inner strips 10, 10' on the covering walls 3, 3'.

The key 7 has a rectangular hollow profile section *a* which fills the cross section of the channel with a slight sliding play. The hollow profile section *a* forms the actual guide for the slider movement of the key within the channel 11, which is bounded by the outer wall 2 of the frame, its covering walls 3, 3' and the inner strips 10, 10' on the covering walls.

The profile section *a* has on its broad sides projecting side edges *b* and *c* which help to form the finger pressure surface 12. These projecting side edges, together with a lug 13 on one narrow side of the profile section *a* which has associated with it a slot guide 14 in the covering wall 3 facing it, form limiting surfaces for the displacement movement of the key. When pushed in, the side edge *b* comes to rest on the top edge 15 of the side wall 2 which is cut off deeper than the covering walls 3, 3', and the side edge *c* comes to rest on the inner strips 10, 10' which are cut off lower, while the return movement of the key toward the outside is limited by means of a perpendicularly projecting stop surface 13' on the lug 13 which meets the outer edge 14' of the slot 14. During assembly the key is pushed in, flexibly deforming the covering wall 3, until the lug 13 engages in the slot guide 14.

On the profile section *a* on the side furthest from the finger pressure surface 12 a considerably thinner flat profile section *d* is formed, which extends the base surface of the profile section *a* sliding on the inner strips 10, 10'. This flat profile *d* is only half the width of the broad side of the profile section *a*, so that it leaves free spaces above and near it in relation to the cross section area of the profile section. A stop and guide extension *e* is finally formed on the flat profile *d*, and its end edge *f* is reinforced and provided with an oblique ramp *g* for the ejector lever 8.

The longitudinally movable lever 8 serving as ejector has two arms and has on its longer lever arm 19 an angled supporting side strip 20 tapering toward its free end, and in addition a support lug 21 angled at the front, on which the ejector compression spring 9 acts. The support lug 21 is reinforced by means of a transverse strip 22.

The longer lever arm 19 is slit longitudinally to form a detached spring tongue 24, and on this tongue is fitted an engaging cam 25 which is completely in shape to the side notch on the cartridges and placed accordingly. On the end of the longer lever arm 19 a side projection 26 with ramp is also formed, and has associated with it a ramp strip 27 on the adjacent covering wall 3.

The shorter arm or cassette engaging thruster 23 of the flat profile lever is obliquely angled; the cassette meets it when pushed in, and thus brings about a tilting movement of the lever.

A guide strip 28 for the spring 9 is also formed on the side wall 2 in the channel 11 in order to prevent the helical spring from kinking.

Figure 2:
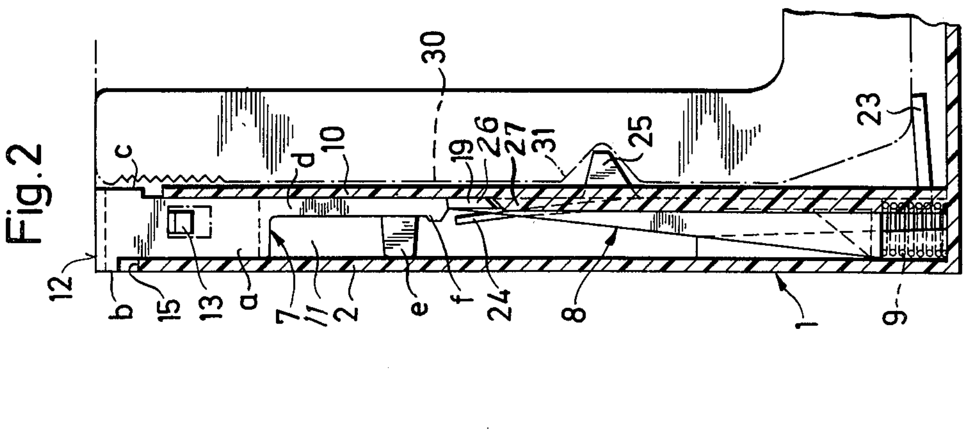

FIG. 2 shows the position of the parts with the cassette pushed in; the cassette 30 is shown by dash-dotted lines. The cassette 30 is thereby held in its storage position by the fact that the cam 25 on the spring tongue 24 is engaged in the notch 31 which is to be found on commercially available cartridges, and the pre-tensioned ejector lever 8 is blocked by the engagement of its longer lever arm 19 beneath the end edge *f* of the flat profile *d* of the key 7.

If pressure is now exerted on the finger pressure surface 12 of the key 7 (FIG. 3), the result is that the side projection 26 on the ejector lever 8 runs up on the ramp strip 27 and the ejector lever is thus disengaged. The result of this is that the ejector lever 8 accelerates forwards, taking the cassette 30 with it, and slides past the flat profile *d* of the key 7 until it meets the lower edge of the profile section *a* of the key or meets the stop extension *e* with a slot edge. When the finger pressure is removed, the key 7 thereby executes an outward movement which is limited by the lug 13 meeting the outer edge 14' of the slot guide 14.

With the finger pressure on the finger pressure surface 12, the cassette is conveyed into and held in a position in which it can easily be grasped and pulled out. A certain braking effect has to be overcome when pulling out the cassette since the cam 25 on the spring tongue 24 must be pushed out of the notch 31 in the cartridge, but the tongue 24 is supported inside on the side wall 2.

The off-center placing of the cam 25 on the spring tongue 24 offers the advantage that the cartridges can only be introduced into the containers in a certain position in order for the locking and holding mechanism to take effect. Otherwise the cassette can in fact be pushed in without damage to the mechanism or the cassette itself, but the lever cannot engage beneath the key and conveys the cassette out again immediately.

Figure 6:
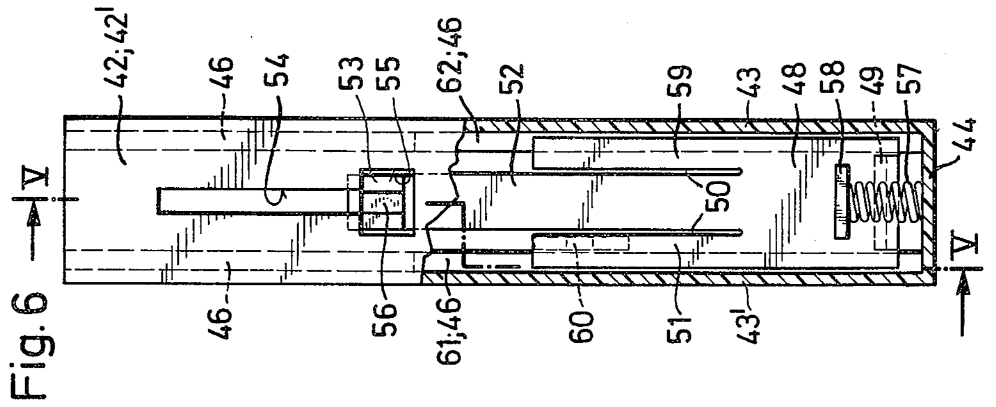
FIG. 6 is a side view of the container in FIG. 5, seen in the direction of the arrow B.
Figure 5:
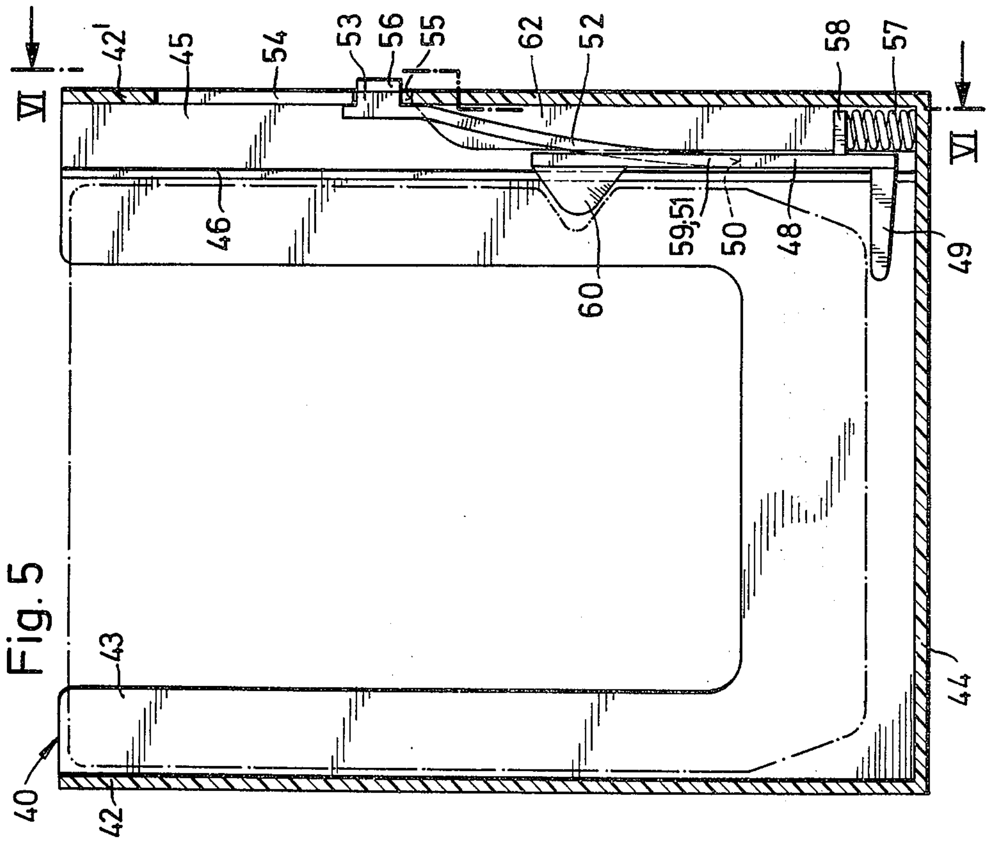
FIG. 5 is a partial sectional view of a second embodiment of the container.
Figure 10:
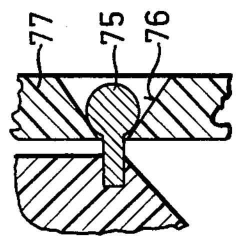
FIG. 10 is an extract from FIG. 9.
Figure 9:
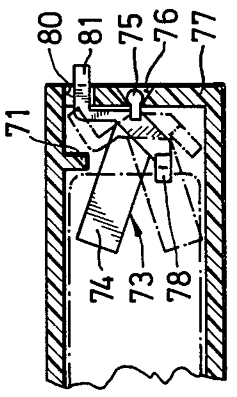
FIG. 9 shows a partial section through the container in FIG. 7 along the line D—D, seen in the direction of the arrow.
Figure 8:
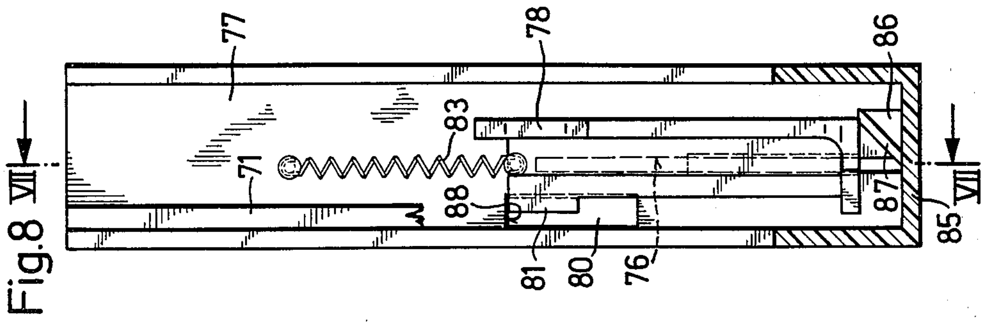
FIG. 8 shows a sectional partial view of the container in FIG. 7, seen in the direction of the arrow C.

A second sample embodiment for the subject of the invention is shown in FIGS. 5 and 6.

The container 40 has a similar outline to the first sample embodiment and, like the latter, has side walls 42, 42', covering walls 43, 43', and a base 44. The container in this embodiment is also stackable, but for the sake of simplicity the strips and grooves provided for this purpose are not shown.

Beside the actual receiving chamber a channel 45 is again provided, being limited by inner strips 46 which project inward from the covering walls 43, 43' parallel to the cassette ejection direction. The lever 48 is guided in this channel. It projects with one arm 49 into the cassette receiving chamber, while its other arm has longitudinal slits 50 and is thereby divided into three tongues. The tongue 51 carries a retaining cam 60 which also projects into the cassette receiving chamber. The middle tongue 52 is bent outwards and projects with a lug 53 through the side wall 42' of the container, which has an aperture 454 at this point. The aperture is in the form of a slot which widens into a rectangle 55 at its lowest point. The lug 53 is complementary in shape to this rectangle, but in addition carries a guide extension 56 which can slide along the slot 54 when by means of finger pressure on the lug the latter is moved inwards out of the rectangle. This sliding movement takes place under the influence of a helical spring 57 which is tensioned between the base walls 4 and a lug 58 arranged on the lever 48. Finally, the tongue 59 of the lever 48 is similar in form to the tongue 51 and is used for guiding. The whole lever 48 is made of a plastic which is resiliently deformable to a limited extent.

On the covering wall 43, 43' inside the channel, guide strips 61, 62 are also formed, by means of which the tongues 51 and 59 of the lever in the storage position of the cartridge shown in the drawing are held against the inner strips 46, without, however, hindering the sliding movement of the lever.

As long as the cassette is stored, it is secured by means of the cam 60 and the spring 57 is tensioned. If pressure is exerted on the lug 53, resiliently deforming the tongue 52, the lug in the rectangle 55 is released, its guide extension 56 can slide upwards along the slot-like aperture 54, and the spring 57 releases itself from tension. The tongues 51 and 59 of the lever thereby come free of the guides formed between the inner strips 46 and the guide strips 61, 62, since the latter only extend in the ejection direction for a distance which matches the length of the aperture 54. The cassette can now be removed, since pulling on the latter causes the cam 60 to be pushed resiliently out of the cassette notch. The cassette is prevented from being catapulted out by the friction between cam 60 and the edge of the cassette.

If an attempt is made to push the cassette in the wrong way round, the lever cannot be pushed downwards, since the cam 60 is then clamped in between cassette edge and guide strips 61.

In the embodiment according to FIGS. 7 – 10, the container 70 again has a substantially U-shaped outline, and by means of an inner strip 71 a lateral channel 72 is separated from the actual cassette receiving chamber. The lever 73 is arranged inside the channel 72 so that it can slide. With its arm 74 the lever engages beneath the lower edge of the cassette. The lever 73 is anchored by means of a hinge strip 75 in a lateral slot 76 in the side wall of the container 77, and can be pivoted to a limited extent about the inside edge of this slot 76. Above the hinge strip there is on the lever 73 a cam 78 which is complementary in shape to that of the cassette notch, but is not quite as deep as the latter, being cut off. Finally, the same side wall 77 of the container has an elongated hole 80 in which a lug 81 of the lever 73 can lock itself. The lug 81 has an oblique surface 82. Between the lug 81 and the cam 78 a helical traction spring 83 engages which is anchored in the side wall 77 of the container above the slot 76 at 84.

Finally, between the side wall 77 and the base 85 of the container a slide 86 is formed, with an actuating slope 87.

Figure 7:
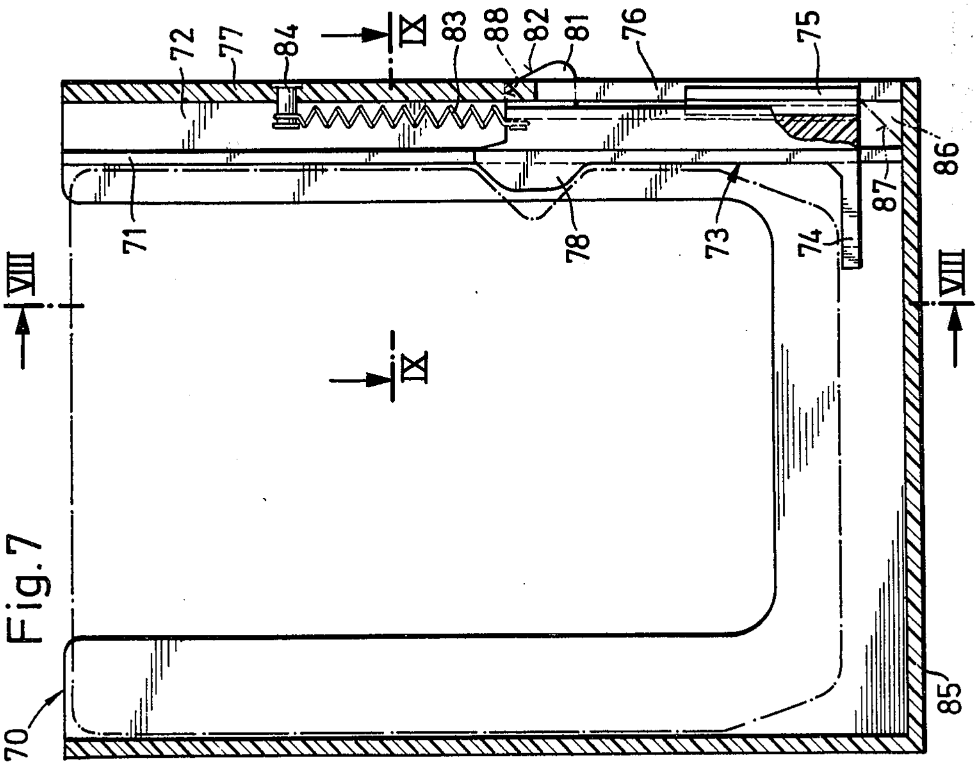
FIG. 7 shows a partial section through a third container according to the invention.

In FIG. 7 the cassette is locked in the storage position. It is held by the cam 78 and can only be removed if pressure is exerted with the finger on the lug 81. The lever in the hinge — hinge strip 75 and slot 76 — is thereby pivoted in an anticlockwise direction (FIG. 9), so that the cam 78 is rotated out of the cassette notch. This is indicated by dash-dotted lines in FIG. 9. The lever arm 74 is also pivoted, but still engages beneath the cassette. Finally, during the pivoting movement the oblique surface 82 on the lug 81 comes under the locking edge 88 of the elongated hole 80, so that the spring 83 can convey the lever 73 outwards, and with it the cassette. The dimensions are such that the cam 78 still rubs against the side edge of the cassette so that the latter is braked when it is pulled out completely. The end of the slot 76 thereby limits the outward movement of the lever.

When a cassette is pushed in, the lever 73 at first remains in the unlocked position, since the lug 81 still rests against the side wall of the container and can only engage in the elongated hole in the end position. In order to bring this about automatically, the slide 86 is provided on which the lever runs up and is rotated accordingly. This is of course only possible when the notch in the cassette is opposite the cam 78, otherwise the lug does not drop into place and the cassette is rejected.

Figure 12:
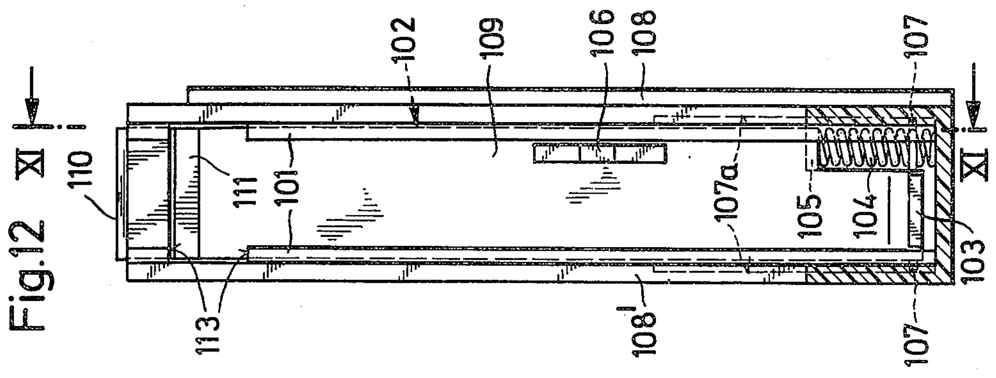
FIG. 12 is a sectional view along the line D—D in FIG. 11.
Figure 11:
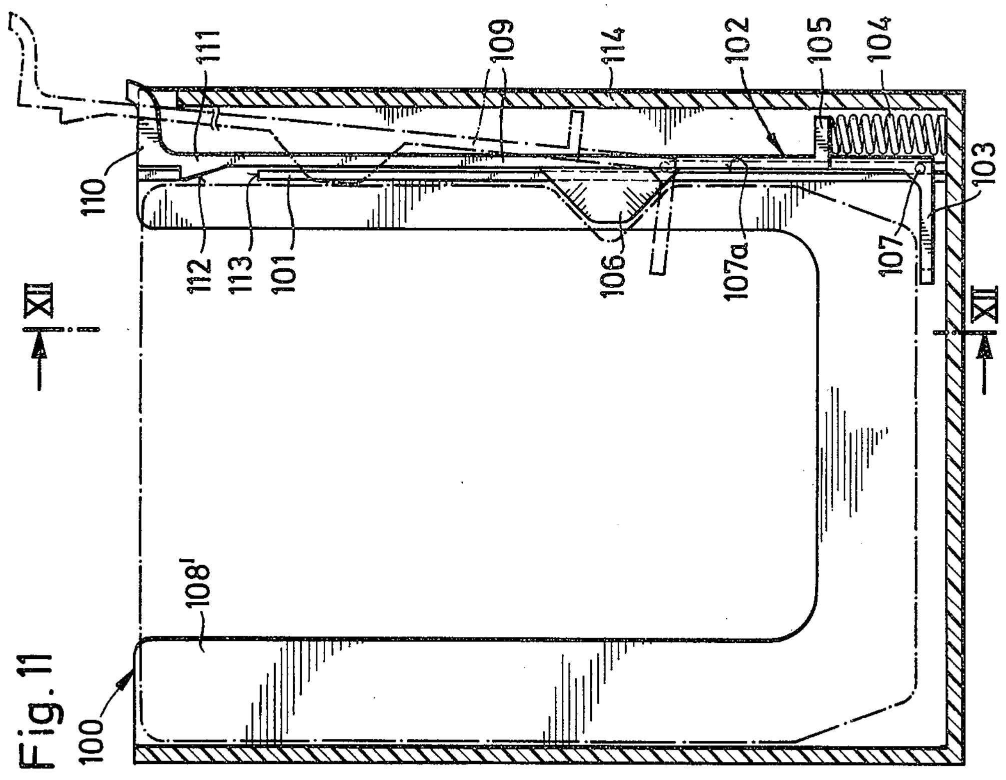
FIG. 11 shows a partial section through a fourth embodiment.

A further sample embodiment is shown in FIGS. 11 and 12. The container 100 is again divided by means of inner strips 101 into a cassette receiving chamber and a lateral channel in which the lever 102 can move. The lever 102 engages with its arm 103 beneath the cassette and is pre-tensioned toward the outside by means of the helical compression screw 104 which engages with the lug 105 of the lever. As in the sample embodiments described previously, the lever 102 has a cam 106 which is complementary in shape to that of the notch in the cassette.

The lever is guided in the container by means of two studs 107 which are anchored in lateral guide slots **107*a* inside the container; the guide slots are formed in the covering walls 108, 108' of the container 100.**

Beyond the cam 106 the lever arm 109 extends as far as the front opening of the container 100, where the lever arm 109 is cut off so that a key 110 is formed. The key is provided with a lug 111 with oblique surface 112, which engage in excisions 113 in the inner strips and can thus be locked.

The cassette is in this way held in the storage position according to FIG. 11. When pressure is exerted on the key 110 and the lug 111 is released and the spring 104 conveys the lever 102 outwards, and with it the cassette resting on the lever arm 103. The extension of the lug 105 is so calculated that in the outer end position of the lever the lug rests against the side wall 114 of the container and thus limits the outward pivoting movement of the lever 102 about the stud 107, but allows the cam 106 to come so far out of the notch in the cassette that the latter can now be removed completely, as the cam 106 is resiliently deflected sideways (the whole lever 102 is made of a plastic which is resiliently deformable to a limited extent). It is easily apparent that "incorrect" insertion of the cassette is impossible.

Figure 14:
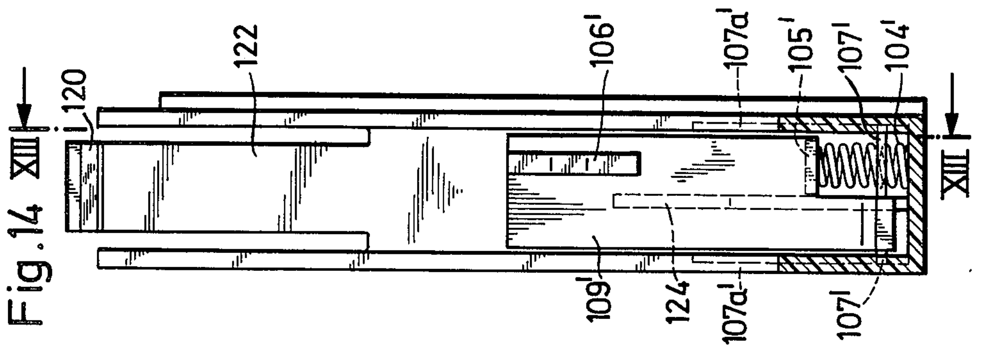
FIGS. 13 and 14 show a modified embodiment of the fourth sample embodiment corresponding to FIGS. 11 or 12.
Figure 13:
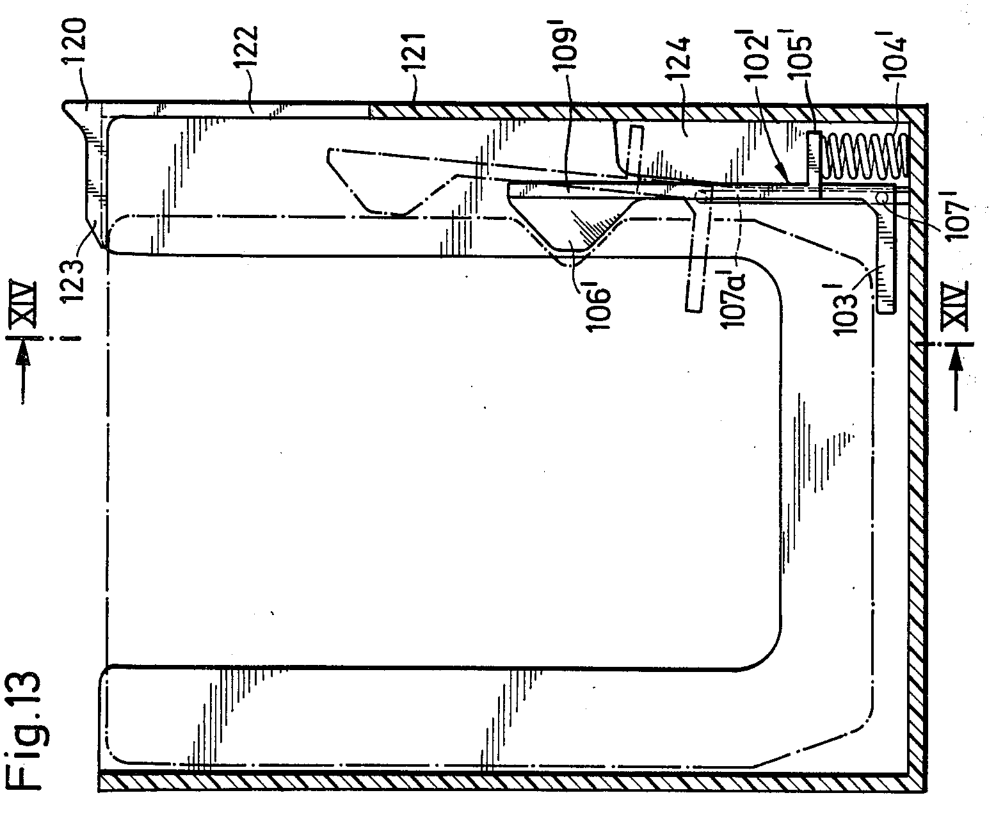

FIGS. 13 and 14 show a further sample embodiment. It differs from the one described last in that the locking is not effected by means of a key fitted on the lever 102', but the key 120 is formed on the side wall 121 of the container for which purpose a slot-like cut is made in the latter. The key 120 is accordingly arranged on the end of a tongue 122 which can be deflected sideways, and its lug 123 engages over the cassette itself. Incorrect insertion of the cassette is again impossible, since the cam-carrying lever arm 109' with cam 106' is pressed by the guide rail 124 into the cassette notch and, if the latter is absent, is jammed.

What is claimed is:

1. A cassette storage container comprising:

a housing adapted to receive and store a cassette; ejector means mounted in the housing;

spring means cooperating with said ejector means to bias said ejector means to an ejection position; and a releasable locking member cooperating with said ejector means to lock said ejector means in an insertion position against the bias of said spring means;

two-movement-allowing mounting and guide means mounting said ejector means for guided movement in the ejection direction and also mounting said ejector means for movement in another manner;

a guide means engaging portion on said ejector means engaging said two-movement-allowing mounting and guide means;

a cassette engaging portion on said ejector means to engage a cassette and move it in the ejection direction;

a mating portion on said ejector means adapted to engage a corresponding mating portion on a correctly inserted cassette by movement of said ejector means in said another manner; and said locking member cooperating with movement in said another manner of said ejector means to releasably lock said ejector means in the insertion position when said mating portion is engaged and to provide an eject condition when said mating portion is disengaged.

2. A cassette storage container as claimed in claim 1, wherein the said mounting and guide means comprises channel defining means and the locking member comprises a finger actuable key accessible at the outside of the housing by the cassette entry position and located at one end of the channel defining means.

3. A cassette storage container as claimed in claim 2, wherein stop means are provided to limit the movement of the key and the key comprises a body portion with a generally flat guide and stop portion projecting therefrom, the guide and stop portion cooperating with the ejector means to guide movement of said ejector means in the ejection direction and to provide a stop for said ejector means in the insertion position.

4. A cassette storage container as claimed in claim 3, wherein the channel defining means comprises a side wall of the housing, two covering walls of the housing, and inwardly projecting inner strips formed on the covering walls; and wherein the stop means are formed by an end edge of the said side wall and the inner strips to limit movement into the housing and by a lug with a blocking surface on the key and associated means in the housing defining a slot to limit movement out of the housing.

5. A cassette storage container as claimed in claim 4, wherein the said guide and stop portion has a projection thereon acting against the said one side wall of the housing whereby the side inner strips and said one side wall cooperate with the said guide and stop portion to guide movement thereof.

6. A cassette storage container as claimed in claim 4, wherein said ejector means comprises a two-armed lever having a longer arm constituting said guide means engaging portion, a shorter arm constituting said cassette engaging portion, and a cam portion projecting from said longer arm constituting said mating portion, said longer arm being located in said channel defining means and said shorter arm and said cam portion projecting between said inner strips into the path of movement of the cassette.

7. A cassette storage container as claimed in claim 6, wherein said longer arm is longitudinally divided to define a first section carrying said cam portion and a spring tongue pointing toward said one said side wall, and a second section carrying a lateral projection, and wherein on the inside of the adjacent covering wall nearest to said lateral projection is formed a control strip cooperating with said ejector means to initiate a tilting movement of said ejector means when said key is actuated.

8. A cassette storage container as claimed in claim 7, wherein said first section is formed with a lug cooperating with said channel defining means for guided movement therein and engaging one end of said spring means, said channel defining means including an additional guide strip located in the compression zone of said spring means to position said spring means and said lug.

9. A cassette storage container as claimed in claim 1, wherein said housing comprises side walls and covering walls, said covering walls being generally U-shaped plates having on their outer sides stacking guide members extending in the cassette ejection direction.

10. A cassette storage container as claimed in claim 1, wherein said ejector means comprises a two-armed lever having a longer arm constituting said guide means engaging portion, a shorter arm constituting said cassette engaging portion, and a cam portion projecting from said longer arm constituting said mating portion, wherein said longer arm is formed with a tongue guided by slot defining means formed in a side wall of the housing, said slot defining means and said tongue cooperating to lock said ejector means in the insertion position, and wherein guide strip means in the insertion position, and wherein guide strip means are provided in the housing along the path between insertion and ejection positions to press said longer arm into engagement with the cassette.

11. A cassette storage container as claimed in claim 1, wherein said two-movement-allowing mounting and guide means comprises elongate hinge means engaging a hinge member on said ejector means to allow movement in the ejection direction and pivotal movement about an axis parallel to said ejection direction, manually operable means are provided to pivot said ejector means into an unlocked position, and slide means are provided in the housing to pivot said ejector back into a locked position.

12. A cassette storage container as claimed in claim 1, wherein said two-movement-allowing mounting and guide means comprises means in the housing defining longitudinal guide channels, said guide means engaging portion comprises studs on said ejector means located by said means defining longitudinal guide channels, and finger actuable key means is provided to resiliently deform said ejector member to release it from the locked position.

13. A storage container for cassettes incorporating an angular excision, comprising;

a cassette housing having an open side and a storage compartment to receive, eject and linearly guide a cassette in snug fitting relation and also having an ejector space adjacent said compartment, ejector means in the ejector space and movable toward and away from the open side of the housing, the ejector means including a cassette engaging thruster projecting into the storage compartment to underlie and thrust the cassette in the ejection direction toward the open side of the housing, the ejector means also having a mating insert movable transversely of the ejection direction for insertion into and removal from the storage compartment and the angular excision of the cassette, the ejector means also including mating insert-positioning and thruster-propelling apparatus operating in response to inward movement of the cassette and thruster from the open side of the housing and urging the mating insert into the angular excision of a correctly oriented cassette and developing spring pressure on the thruster tending to move the thruster in the ejection direction, and a latch having locked and release positions and restraining the cassette and ejecting means against movement in the ejection direction.

14. The storage container for cassettes according to claim 13 and the ejector means, latch and housing adjacent the ejector space having mutually interfering portions preventing the latch from moving to locked position in response to failure of the mating insert to move transversely by reason of an incorrectly oriented cassette.

15. The storage container for cassettes according to claim 13 and the ejector means including a resiliently flexible mounting portion for said mating insert, the ejector means and housing adjacent the ejector space having mutually interfering portions preventing the mating insert from moving transversely entirely clear of the cassette during ejection and reception of the cassette in the housing, the resiliently flexible mounting portion maintaining the mating insert in braking engagement with the cassette during rejection.

16. The storage container according to claim 13 and the mating insert-positioning and thruster-propelling apparatus including a lug affixed to the thruster and mating insert and extending transversely across the ejector space and oppositely of the thruster, the spring bearing against the lug in the ejection direction for engaging the cassette and for urging the mating insert into the excision of the cassette.

17. The storage container according to claim 13 and the mating insert-positioning and thruster-propelling apparatus including a camming slide on the housing in the ejector space and engaging the ejector means and producing such transverse movement of the mating insert into the cassette excision in response to inward movement of the cassette and thruster of the ejection means.

18. The storage container for cassettes according to claim 13 and the mating insert-positioning and thruster-propelling apparatus including means mounting the elongate thruster at an oblique angle in substantially fixed relation to said mating insert, the thruster extending obliquely toward the open side of the housing and transversely of said ejection direction to be first engaged at its outer end by the cassette moving into the storage compartment to tilt the mating insert into the cassette excision.

* * * * *

UNITED STATES PATENT OFFICE
CERTIFICATE OF CORRECTION

Patent No. 3,926,310 Dated December 16, 1975

Inventor(s) Peter Ackeret

It is certified that error appears in the above-identified patent and that said Letters Patent are hereby corrected as shown below:

In claim 10, lines 30 and 31, delete second occurrence of "in the insertion position, and wherein guide strip means".

Signed and Sealed this

*second* Day of *March 1976*

[SEAL]

*Attest:*

RUTH C. MASON
*Attesting Officer*

C. MARSHALL DANN
*Commissioner of Patents and Trademarks*